(12) United States Patent
Biernat et al.

(10) Patent No.: US 8,768,327 B2
(45) Date of Patent: Jul. 1, 2014

(54) FEATURE BASED MANAGEMENT

(75) Inventors: Krzysztof Biernat, Wroclaw (PL); Jari Esa Juhani Taavela, Wroclaw (FI); Lukasz Kantoch, Czeladz (PL); Piotr Tomczak, Wroclaw (PL); Marcos Montiel Castellanos, Wroclaw (PL); Jan Gorecki, Kamieniec Wroclawski (PL)

(73) Assignee: Nokia Solutions and Networks Oy, Espoo (FI)

( * ) Notice: Subject to any disclaimer, the term of this patent is extended or adjusted under 35 U.S.C. 154(b) by 71 days.

(21) Appl. No.: 13/510,397

(22) PCT Filed: Nov. 17, 2009

(86) PCT No.: PCT/EP2009/065280
§ 371 (c)(1),
(2), (4) Date: Sep. 7, 2012

(87) PCT Pub. No.: WO2011/060810
PCT Pub. Date: May 26, 2011

(65) Prior Publication Data
US 2012/0322432 A1    Dec. 20, 2012

(51) Int. Cl.
*H04M 3/00*    (2006.01)

(52) U.S. Cl.
USPC ........................................................ 455/418

(58) Field of Classification Search
CPC ................................ H04W 4/16; H04W 24/04
USPC ........... 455/418, 435.1–435.2, 466, 458, 419, 455/404.1, 410, 411; 370/259
See application file for complete search history.

(56) References Cited

U.S. PATENT DOCUMENTS

| | | | |
|---|---|---|---|
| 7,580,718 B2 * | 8/2009 | Mademann | 455/458 |
| 2008/0181110 A1 * | 7/2008 | Ramakrishnan et al. | 370/232 |
| 2010/0034176 A1 * | 2/2010 | Heo et al. | 370/335 |

FOREIGN PATENT DOCUMENTS

| | | |
|---|---|---|
| EP | 1 545 056 A1 | 6/2005 |
| WO | 00/75802 A1 | 12/2000 |

OTHER PUBLICATIONS

Issa, Omneya et al., "Low-Interference Service Management Approach for Mobile Networks", XP-002577759, International Journal of Wireless Information Networks, Jun. 2009, pp. 33-43.
International Search Report application No. PCT/EP2009/065280 dated Apr. 28, 2010.
European Office Action dated Apr. 15, 2014, for corresponding European Patent Application No. 09759705.8.

* cited by examiner

*Primary Examiner* — Kiet Doan
(74) *Attorney, Agent, or Firm* — Squire Sanders (US) LLP

(57) ABSTRACT

The present invention relates to feature based management in which a request to activate or deactivate a service in a telecommunication network. The at least one prerequisite features necessary to activate or deactivate the requested service are identified and it is determined if each of the at least one prerequisite features are fulfilled such that the requested service in the telecommunication network is activated or deactivated in the event that all of the prerequisite features are fulfilled.

9 Claims, 6 Drawing Sheets

FEATURE BASED MANAGEMENT

The present invention relates to network management of a telecommunication network and, in particular, to a feature based management in a telecommunication network.

A conventional telecommunication network typically includes hundreds if not thousands of network elements where different types of network elements provide different functionality and services in the network. The management layer of the telecommunication network typically includes an Element Management System (EMS) and a Network Management System (NMS). The management layer may also further include a Service Management System (ServMS).

The EMS is typically used to manage the functions and capabilities of the different types of network elements in the telecommunication network. The NMS conventionally sits in a hierarchically higher level to the EMS and is used to manage the telecommunication network as a whole. The NMS typically comprises several applications and tools responsible for managing different areas, functionalities, capabilities and aspects of the telecommunication network. For example, the NMS may include applications and tools for Configuration Management (CM), Performance Management (PM), License Management (LM), Software Management (SwM) and Hardware Management (HwM). Accordingly, the NMS can manage various aspects of the telecommunication network.

A network operator is typically a company that obtains a telecommunication network base (e.g. network elements, fibre optic cable and so on) and offers services and functionalities to subscribers of the network operator. Alternatively, the network operator may be a Mobile Virtual Network Operator (MVNO). An MVNO does not own the underlying telecommunication network base but leases it from another network operator.

A network operator that owns the telecommunication network base will typically purchase the network elements and equipment from a network provider. The operation and management of the telecommunication network may be performed by the network operator or via a third party, for example, the network provider.

The network operator will have subscribers that pay a subscription fee to the network operator to use the network operator's telecommunication network along with various services, applications, tools, functionalities and capabilities offered or provided by the network operator.

The term service will be used to encompass all services, applications, tools, functionalities and capabilities that may be activated or deactivated in or on a telecommunication network. Furthermore, the term services may relate to those services that may be offered by a network operator to their subscribers or which may be used by the network operator for the purpose of operating, maintaining and managing their telecommunication network.

Service that may be offered by a network operator to their subscribers may include, for example, Short Message Service (SMS), Multimedia Message Service (MMS), Voice Calls, Data, Mobile TV and so on. The network operator may also use services to improve operation of the telecommunication network, the management systems and so on. As a person skilled in the art will appreciate there are numerous and various services relating to the operation, use and management of a telecommunication network.

The cost of and ability to implement various services in the telecommunication network means that a network operator may only use a subset of all the available services at any one time but may wish to activate or deactivate a particular service depending on the network operator's needs and requirements.

Accordingly, a network operator may decide at any time that they wish to add, for example, the service of Mobile TV. The network operator may wish to implement this service in part of, or all of, their telecommunication network in order to offer the service of Mobile TV to some or all of its subscribers. The network operator may also wish to add, for example, new management services to improve the management and operation of the telecommunication network. For example, the network operator may wish to add a Hardware Browser for 3G network elements application to their management systems if the network operator has expanded the telecommunication network base to include 3G elements.

Conventionally, it is very difficult for services to be activated or deactivated in a telecommunication network and therefore many of the embodiments of the present invention describe new methods and apparatus for activating and/or deactivating services in a telecommunication network.

According to a first aspect of the present invention there is provided a method comprising the steps of: receiving a request to activate or deactivate a service in a telecommunication network; identifying at least one prerequisite feature necessary to activate or deactivate said service; and determining if each of the at least one prerequisite feature is fulfilled such that said service in said telecommunication network is activated or deactivated in the event that all of said at least one prerequisite features for said service are fulfilled.

The request may be received from a Network Operator or via a management system such as the Service Management System (ServMS). The request may include various pieces of information relating to the service that is requested to be activated or deactivated in the telecommunication network. For example, the service may be identified, a specific part of the telecommunication network in which the service is to be activated/deactivated may be identified and topology information regarding the telecommunication network may be identified along with any other necessary information.

The services may include services, functionalities or applications provided to subscribers, e.g. Short Message Service (SMS), Multimedia Message Service (MMS), Voice Services, Data Services, GPS Services, Mobile TV and so on. The services may also include applications, tools and functionality for the network operator to improve the operation or use of the telecommunication network, enhance or improve the management of the telecommunication network, e.g. network management applications based in the network management systems and so on. In other words, the term service is used to encompass any service, tool application, functionality or capability that can be activated and/or deactivated in a telecommunication network relating to the use, operation or management of the telecommunication network or any services that may be implemented in the telecommunication network that may or may not be offered to subscribers of the network operator.

The step of identifying at least one prerequisite feature may further comprise requesting the at least one prerequisite feature necessary to activate or deactivate the service from a prerequisite feature database; and receiving the at least one prerequisite feature necessary to activate or deactivate the service from the database. For each service that may be activated or deactivated there may be at least one prerequisite feature that should be fulfilled in order to be able to activate or deactivate the service. In other words, a particular service may be defined by at least one prerequisite feature where the prerequisite features specify various requirements that should be fulfilled in order to activate or deactivate the particular service. In many of the embodiments the prerequisite features for each service may be stored in a prerequisite feature database so that once the request to activate or deactivate a particular service is received then the prerequisite features for that service can be identified from the prerequisite feature database. Thus, many of the embodiments provide or enable a new feature based management in relation to activating or deactivating services in a telecommunication network.

For each of the identified at least one prerequisite features it is determined whether they are fulfilled. Each prerequisite feature may define or specify a condition, requirement or task that needs to be fulfilled in order to be able to activate or deactivate a particular service. The prerequisite feature is fulfilled if the feature (e.g. the condition, requirement or task) has or can be completed or met. For example, if the prerequisite feature relates to the need for particular software to be activated on particular network elements then the prerequisite feature will be fulfilled if the software is present and activated on the identified network elements. If the prerequisite feature relates to particular functionality being active then the prerequisite feature will be fulfilled when the functionality is activated. If the prerequisite relates to a particular configuration of the network elements then this prerequisite feature will be fulfilled once the configuration of the network elements has been completed or met. Thus, as a person skilled in the art will appreciate, the prerequisite features define the necessary features, which may relate to any aspect of the telecommunication network, that should be fulfilled in order to be able to activate or deactivate a requested service.

The method may further comprise transmitting each of said at least one prerequisite features to at least one telecommunication network application or system to determine if each of said at least one prerequisite features are fulfilled.

The network applications may include Configuration Management (for prerequisite features pertaining to network element configuration), Hardware Management (for prerequisite features pertaining to network hardware), Software Management (for prerequisite features pertaining to network software), License Management (for prerequisite features pertaining to licenses) and so on. The systems may include the Network Management System, Element Management System, Service Management System and Network Elements.

The method may transmit only the prerequisite feature relevant to a network application or may also transmit further information. For example, the prerequisite feature may relate to licenses and therefore the method may transmit only the licenses to provision or revoke to the relevant network application or the method may transmit the licenses to provision or revoke along with further information such as the network elements affected to the relevant network application.

The method may determine whether a prerequisite feature is fulfilled by further comprising receiving confirmation from the network applications or systems indicating whether or not at least one of the prerequisite features has been fulfilled. If the confirmation received is negative then the method may stop determining if further prerequisite features are fulfilled and transmit a status report indicating the negative result in response to the original request to activate or deactivate the service.

Alternatively, the method may continue until a confirmation (either negative or positive) has been received regarding all the identified prerequisite features and then transmit a status report indicating the success or failure of activating or deactivating the service in response to the original received request.

The status report transmitted in response to the request to activate or deactivate a service may include a simple positive or negative result, may include more detailed report of the activation or deactivation of the service and may further include, in the event that a prerequisite feature could not be fulfilled, possible corrective actions that may be taken in order to overcome the failed prerequisite feature.

The method may further determine the order in which it should be determined whether the prerequisite features are fulfilled. The method may consider each prerequisite feature for a given service in turn or may consider all the prerequisite features at the same time.

The method may further comprise identifying network topology information. The network topology information may be received as part of the request to activate or deactivate a service, may be requested and received from one or more network applications or systems (e.g. management systems, network elements) or may be part of the application or system performing the method.

The method may further comprise receiving monitoring information wherein the monitoring information relates to the performance and operation of the telecommunication network for a period after the service has been activated or deactivated; and analysing the monitoring information to determine if any problems are identified in the telecommunication network relating to the activation or deactivation of the service.

Accordingly, the method may monitor and analyse the operation of the telecommunication network, or a specific part of the telecommunication network, in order to determine and/or identify whether the service, that has been activated or deactivated, is operating correctly, optimally and/or efficiently in the telecommunication network. The monitoring information may include telecommunication network performance indicators, telecommunication network fault information, and telecommunication network log information.

The period may be predetermined and for any period deemed necessary or appropriate in order to analyses the performance and operation of the telecommunication network. For example, the period may be one day, one week, several weeks, one month, several months, one year, several years, the lifetime of the service and so on.

The method may analyse the received monitoring information to determine if there are any problems with the operation and performance of any part of the telecommunication network that directly or indirectly relates to the activation or deactivation of the service.

If said problems are identified then the method may further comprise determining at least one corrective action to take in response to said identified problems; and performing said determined corrective actions.

Accordingly, the method may determine a corrective action to take in response to any identified or determined problem in the telecommunication network. For example, if the method determines that the performance of the network elements implementing an activated service is not as expected then the method may determine that the corrective action may be to reconfigure the network elements. The method may alternatively determine that the corrective action may be to restart the process of activation or deactivation of the service from the beginning.

If the method determines a particular corrective action should be taken then the method further takes the step of performing the corrective action. For example, if it is determined that the network elements require reconfiguring then the method may further determine the new configuration and transmit the new configuration to the appropriate network application (e.g. the Configuration Management application) to perform the reconfiguration.

The method may also interact with further network applications and systems such as a Charging and Billing Centre in order to inform the Charging and Billing Centre of the changes in the telecommunication network (e.g. the activation or deactivation of the service) so that a network operator can be billed accordingly.

According to a second aspect of the present invention there is provided an apparatus comprising: a first input adapted to receive a request to activate or deactivate a service in a telecommunication network; a first processor adapted to identify at least one prerequisite feature necessary to activate or deactivate said service; and a second processor adapted to determine if each of said at least one prerequisite feature is fulfilled such that said service in said telecommunication network is activated or deactivated in the event that all of said at least one prerequisite features for said service are fulfilled.

According to a third aspect of the present invention there is provided an apparatus adapted to: receive a request to activate or deactivate a service in a telecommunication network; identify at least one prerequisite feature necessary to activate or deactivate said service; and determine if each of said at least one prerequisite feature is fulfilled such that said service in said telecommunication network is activated or deactivated in the event that all of said at least one prerequisite features for said service are fulfilled.

The apparatus may further comprise a first output adapted to request said at least one prerequisite feature necessary to activate or deactivate said service from a database; and a second input adapted to receive said at least one prerequisite feature necessary to activate or deactivate said service from said database.

The apparatus may further comprise a second output adapted to transmit each of said at least one prerequisite features to at least one telecommunication network application or system to determine if each of said at least one prerequisite features are fulfilled.

The apparatus may further comprise a third input adapted to receive monitoring information wherein said monitoring information relates to the performance and operation of said telecommunication network for a period after said service has been activated or deactivated; and a third processor adapted to analyse said monitoring information to determine if any problems are identified in the telecommunication network relating to the activation or deactivation of said service.

The apparatus may further comprise a fourth processor adapted to identify at least one corrective action to take in response to said identified problems; and a fifth processor adapted to perform said identified corrective actions.

The apparatus may be a computing device, for example, a server. The first input, second input and third input may be the same input, different inputs or any combination thereof.

The first output and second output may be the same output or different outputs. The first processor, second processor, third processor, fourth processor and fifth processor may be the same processor, different processor or any combination thereof.

The apparatus may be adapted using logic means where the logic means may be implemented in software, hardware or any combination thereof.

According to a fourth aspect of the present invention there is provided a computer program product comprising computer readable executable code for: receiving a request to activate or deactivate a service in a telecommunication network; identifying at least one prerequisite feature necessary to activate or deactivate said service; and determining if each of said at least one prerequisite feature is fulfilled such that said service in said telecommunication network is activated or deactivated in the event that all of said at least one prerequisite features for said service are fulfilled.

The computer program product may further comprise computer readable executable code for requesting said at least one prerequisite feature necessary to activate or deactivate said service from a database; and receiving said at least one prerequisite feature necessary to activate or deactivate said service from said database.

The computer program product may further comprise computer readable executable code for transmitting each of said at least one prerequisite features to at least one telecommunication network application or system to determine if each of said at least one prerequisite features are fulfilled.

The computer program product may further comprise computer readable executable code for receiving monitoring information wherein said monitoring information relates to the performance and operation of said telecommunication network for a period after said service has been activated or deactivated; and analysing said monitoring information to determine if any problems are identified in the telecommunication network relating to the activation or deactivation of said service.

The computer program product may further comprise computer readable executable code for identifying at least one corrective action to take in response to said identified problems; and performing said identified corrective actions.

The computer program product may be a storage medium.

Embodiments will now be described, by way of example only and with reference to the accompanying drawings, in which.

Figure 1:
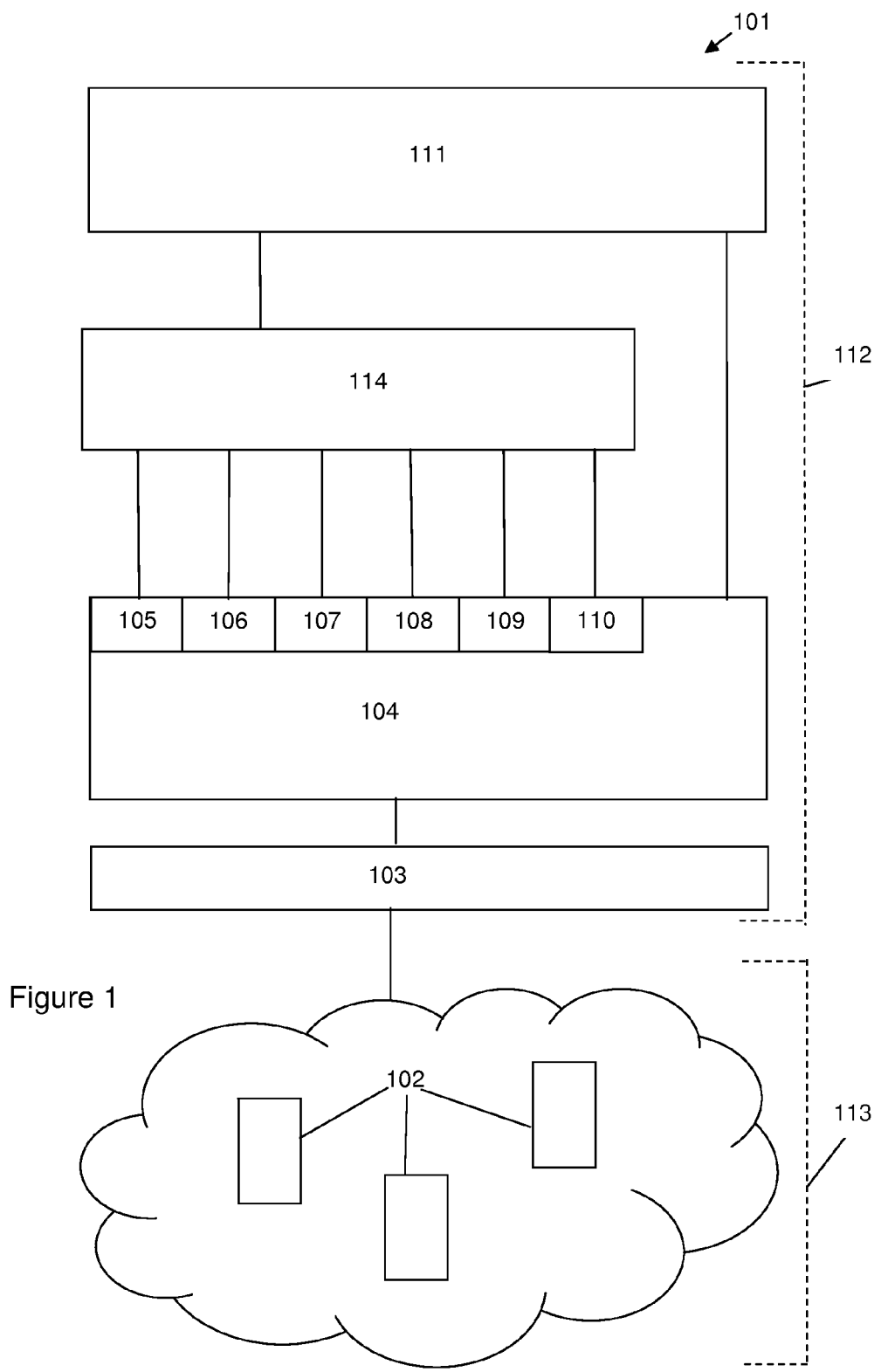
FIG. 1 is a block diagram in accordance with many embodiments of the present invention.

FIG. 1 shows a typical architecture of a simple and small telecommunication network 101. The telecommunication network 101 typically comprises a management layer 112 and a managed network layer 113.

The managed network layer 113 typically comprises a plurality of network elements (NE) 102 which provide various functionalities and capabilities for both the network operator and the subscriber's of the network operator. For example, the NEs 102 may include routers, base station transceivers, cross-connects, switches and so on. As a person skilled in the art will appreciate there are a plurality of different types of NEs that can form part of the managed network layer 113 in the telecommunication network 101.

The functionalities and capabilities of the different types of NEs 102 are managed by an Element Management System (EMS) 103 which is part of the management layer 112. The EMS 103 may then be managed by a Network Management System (NMS) 104 which is also part of the management layer 112.

The NMS 104 may also manage the telecommunication network 101 as a whole and therefore it may include one or more tools, applications or functionalities to manage different aspects of the telecommunication network 101. For example, the NMS 104 may include tools for Configuration Management (CM) 105, Software Management (SwM) 106, Hardware Management (HwM) 107, License Management (LM)

108, Performance Management (PM) 109 and Fault Management (FM) 110. As a person skilled in the art will appreciate, the NMS 104 may include any further tools for managing different aspects of the telecommunication network 101.

The typical telecommunication network 101 may also further include a Service Management System (ServMS) 111 which sits at a hierarchically higher level above the NMS 104. The ServMS 111 is typically used to manage services in the telecommunication network 101.

In many of the embodiments of the present invention there is provided feature management functionality and capability enabling management to be performed directly on a feature level. The feature management aspect may be provided as a separate and independent Feature Management System (FMS) 114 implemented on an apparatus, for example, a server or computing device (as shown in FIG. 1).

Alternatively, the feature management aspect may form part of, or integrated with, one of the conventional management systems, e.g. the ServMS, the NMS or the EMS. In this case the feature management aspect may be provided as a Feature Management Application (FMA) (not shown in FIG. 1).

In the example shown in FIG. 2, the feature management aspect is provided as a separate FMS 201 positioned in the management layer above the NMS 202 but below the ServMS 203. The example shown in FIG. 2 also relates to the activation of a service in the managed network 208 that comprises a plurality of NEs 209.

The FMS 201 may comprise a database 204 that may include a series of prerequisite features for each service that may be implemented in a telecommunication network. The prerequisite features for each service specify the requirements and settings necessary to activate or deactivate each service. The prerequisite features may include, information or requirements relating to the required hardware and hardware release, information or requirements relating to the required software and software release, information or requirements relating to the required licenses, information or requirements relating to the NE configuration and performance parameters and so on.

Figure 2:
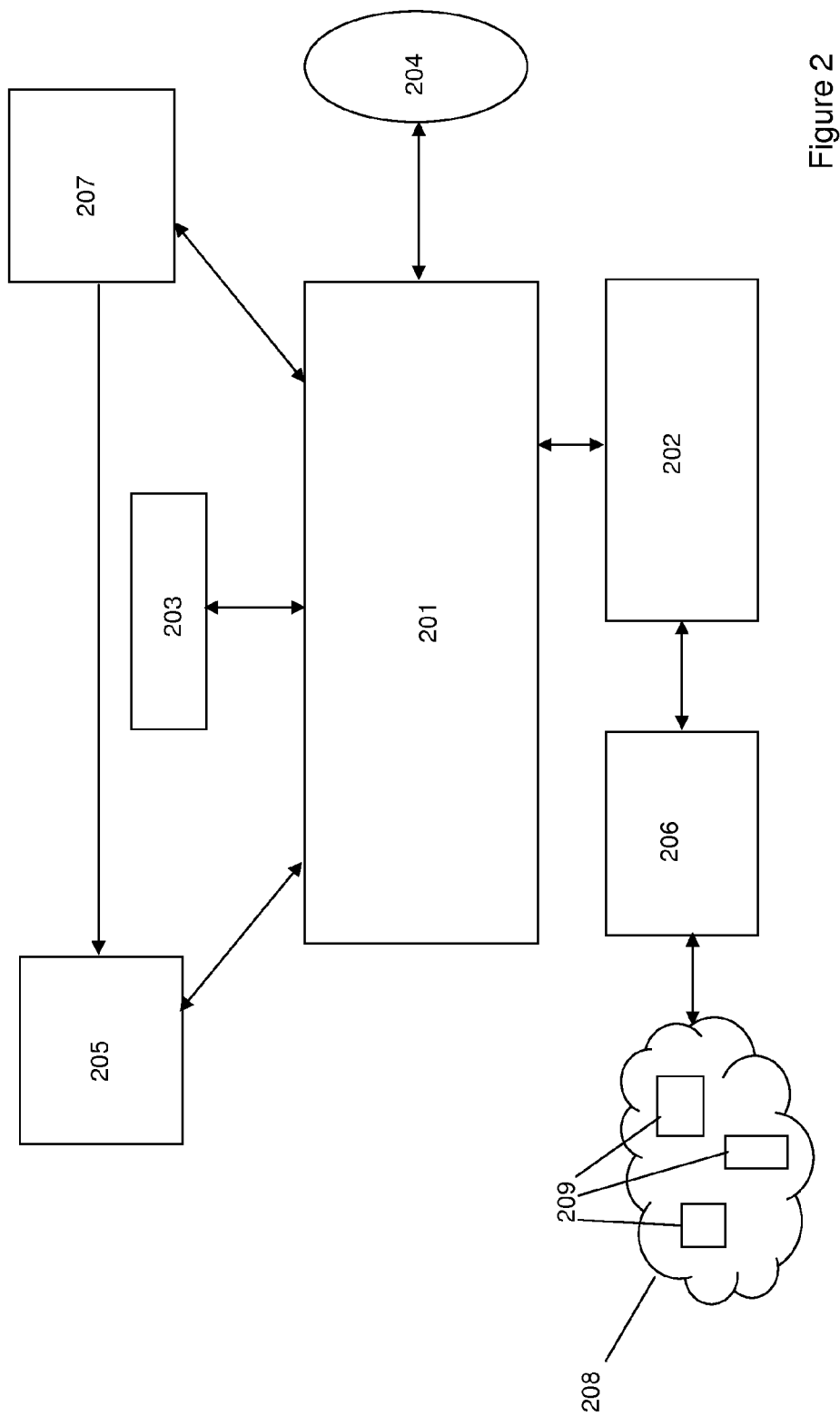
FIG. 2 is a block diagram in accordance with many of the embodiments of the present invention.

The database 204 may be integral to the FMS 201 or be separate to the FMS 201 where the FMS 201 may operatively connect with the database 204 (as shown in FIG. 2) where the database 204 may be located on external apparatus such as a computing device.

The FMS 201 may also monitor any alarm events or fault events originating from the NEs 209 relating to the process of activating, or deactivating, the service in the telecommunication network. This may enable any corrective actions to be taken or to determine that the service cannot be activated or deactivated in the telecommunication network. The FMS 201 may also monitor the performance parameters of the NEs 209 and/or the telecommunication network as a whole during the provisioning process, for a period following activation of the service or for a period following deactivation of the service.

The FMS 201 may also operatively connect to and interact with other systems associated with the network operator, network provider and/or telecommunication network. For example, the FMS 201 may operatively connect to and interact with the network provider's Charging and Billing Centre (CBC) 207. The telecommunication network may also include an EMS 208 for managing the NEs 209.

A network operator 205 may decide to add a new service to their telecommunication network. The service that may be added by the network operator may relate to services to be offered to their subscribers, e.g. mobile TV, fast data transfer and so on. The service that may be added may relate to the management or operation of the telecommunication network, e.g. to add a hardware browser for 3G NEs, to add end to end rollout application, to add trace viewing application and so on. As a person skilled in the art will appreciate the services that may be provisioned and activated in accordance with many of the embodiments of the present invention may relate to the operation, maintenance and/or use of the telecommunication network.

The network operator 205 when requesting a new service to be activated in their telecommunication network may also specify which managed objects in the telecommunication network the service shall be applied to. In other words, the network operator can specify NEs or areas of the telecommunication network that the service may be applied to. For example, if the network operator's telecommunication network spans a whole country then based on the demographic of the network operator's subscribers the network operator may decide to only provision a given service in a particular or specific part of their telecommunication network.

In order to add a new service the network operator 205 may transmit a request directly to the FMS 201. Alternatively, the ServMS 203 may receive or initiate the request and inform the FMS 201 accordingly. The network operator may request a particular new service by completing an electronic form, clicking the appropriate service name in a list of available services, sending a message and so on.

On receipt of the request at the FMS 201 several processes may be performed or initiated by the FMS 201. The FMS 201 may obtain or identify any prerequisite features from a database 204 for the service and then proceed to determine whether those prerequisite features can be fulfilled. For example, the prerequisite features may include particular hardware is required in the NEs 209, particular software to be active in the NEs 209, particular configuration and performance parameters. The FMS 201 may also handle alarm events or fault events resulting from the activation (or deactivation) of the service, to provision (or revoke) the required licenses, to interact with the CBC 207 and so on.

The FMS 201 may initially check a database 204 for the prerequisite features for the requested service to enable the service to be activated. The FMS 201 may then check whether the prerequisite features for the service can be fulfilled. In order to determine whether the prerequisite features can be fulfilled the FMS 201 may take any or all of the following steps.

The FMS 201 may interact with the management systems (e.g. EMS 208, NMS 202, and ServMS 203) in order to obtain network topology information and information regarding the NEs. The FMS 201 may obtain the network topology and NE information each and every time that a new service is to be activated in the telecommunication network or the FMS 201 may obtain the information once which may be updated should the information change or be altered.

The FMS 201 may request the information from the NMS 202 wherein the NMS 202 can in turn request the specific NE information from the EMS 208. Alternatively, the FMS 201 can interact with the EMS 208 directly. Alternatively, the topology information may be provided to the FMS 201 as part of the request to activate the service.

Once the FMS 201 has obtained or accessed information relating to the network topology and/or the NEs 209 then the FMS 201 may check whether the prerequisite features for the service are, or can be, fulfilled. For example, the FMS 201 may check with a Hardware Management (HwM) application, which is typically part of the NMS 202, that the NEs 209 have the required hardware (as may be specified or identified by a prerequisite feature) including the hardware version or release number.

The FMS 201 may further check with a Software Management (SwM) application, which is typically part of the NMS 202, that the NEs 209 are installed with the required software (as may be specified or identified by a prerequisite feature) including the software version or release number. If the FMS 201 determines that one or more of the NEs or NE types do not have the correct software or software release then the FMS 201 or the SwM application may initiate a software download to the appropriate NEs 209. The required software can then be activated on the NEs 209.

The FMS 201 may further check with a Configuration Management (CM) application, which is typically part of the NMS 202, as to whether the NEs 209 are configured in order to be able to activate the service. If necessary the configuration parameters or a configuration plan can be set in the NEs 209 by the CM application.

The FMS 201 may also interact with a License Management (LM) application which is typically part of the NMS 202, in order to instruct the LM application to provision the required licenses for the particular service (or for a prerequisite feature) to the NEs 209.

The FMS 201 may further interact with a Charging and Billing Centre (CBC) 207 where the FMS 201 informs the CBC 207 of the service being activated so that the network operator to be charged appropriately for the new service.

The service may then be activated in the event that all of the prerequisite features have been fulfilled.

The FMS 201 may further transmit a status report relating to the activation of the service to the network operator 205 and/or to the ServMS 203.

If any one or more of the prerequisite features for a given service cannot be fulfilled then the service may not be able to be activated in the telecommunication network. The FMS 201 will report the failure in the status report so that any necessary corrective actions can be taken.

In many of the embodiments the FMS 201 may also perform monitoring and control functions during the activation process of the new service and also for a period after the service has been activated.

Accordingly, during the provisioning process the FMS 201 may receive any alarm event or fault event information originating from the NEs 209 or management systems (e.g. EMS 208, NMS 202, ServMS 203).

The FMS 201 may also monitor the operation of the service for a period after the service has been activated. The period that the FMS 201 may monitor the operation of the activated service may be any time period deemed appropriate, for example, it may be one day, one week, one month, several months, a year, several years or for the whole lifetime of the service being active.

In order to monitor the operation of the service the FMS 201 may interact with a Log Management (LogM) application, which is typically located in the NMS 202. The FMS 201 may check the logs that are collected by the LogM application in order to determine or identify any interruptions that have been logged which relate to the activation and/or operation of the service in the telecommunication network.

The FMS 201 may also interact with a Performance Management (PM) application, which is typically located in the NMS 202, in order to determine the performance indicators and information regarding the performance of the service in the NEs 209, the managed network 208 or in the telecommunication network as a whole.

The FMS 201 may further interact with a Fault Management (FM) application, which is typically located in the NMS 202, in order to determine whether any alarm events or fault events have been generated by the NEs 209 and/or management systems in relation to the activation or operation of the service.

The FMS 201 may then determine based on the monitoring information from the LogM application, PM application and/or FM application whether the service is operating correctly and optimally in the affected NEs 209 and management systems in the telecommunication network. If the FMS 201 determines based on the monitoring information that the service is not operating correctly or optimally then the FMS 201 may determine that the setup or configuration of the service in the NEs 209 needs to be changed.

If configuration changes are necessary the FMS 201 may instruct the CM application to make the required configuration changes in the NEs 209. The FMS 201 may alternatively determine that the process of provisioning the service should be performed again and thus re-start the activation process from the beginning.

Once the FMS 201 has obtained the monitoring information and irrespective of whether any configuration changes are required in the NEs 209, the FMS 201 may transmit the monitoring information to the CBC 207 in case any changes are required to the charges levied to the network operator 205.

The FMS 201 may also generate a status report based on the monitoring information obtained which may be transmitted to the network operator 205 and/or the ServMS 203.

Figure 3A:
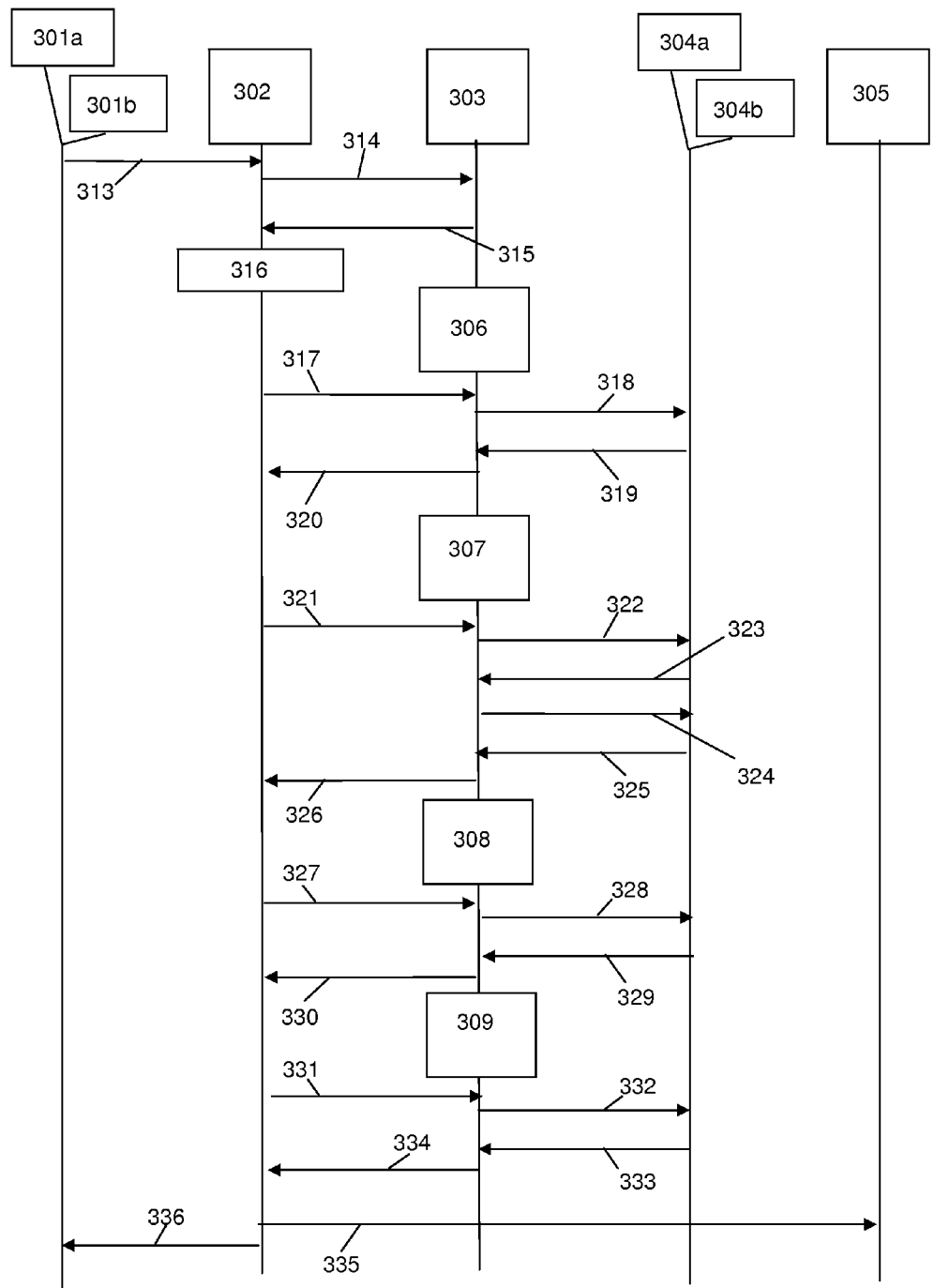
FIG. 3a and FIG. 3b are message flow diagrams in accordance with many of the embodiments of the present invention.
Figure 3B:
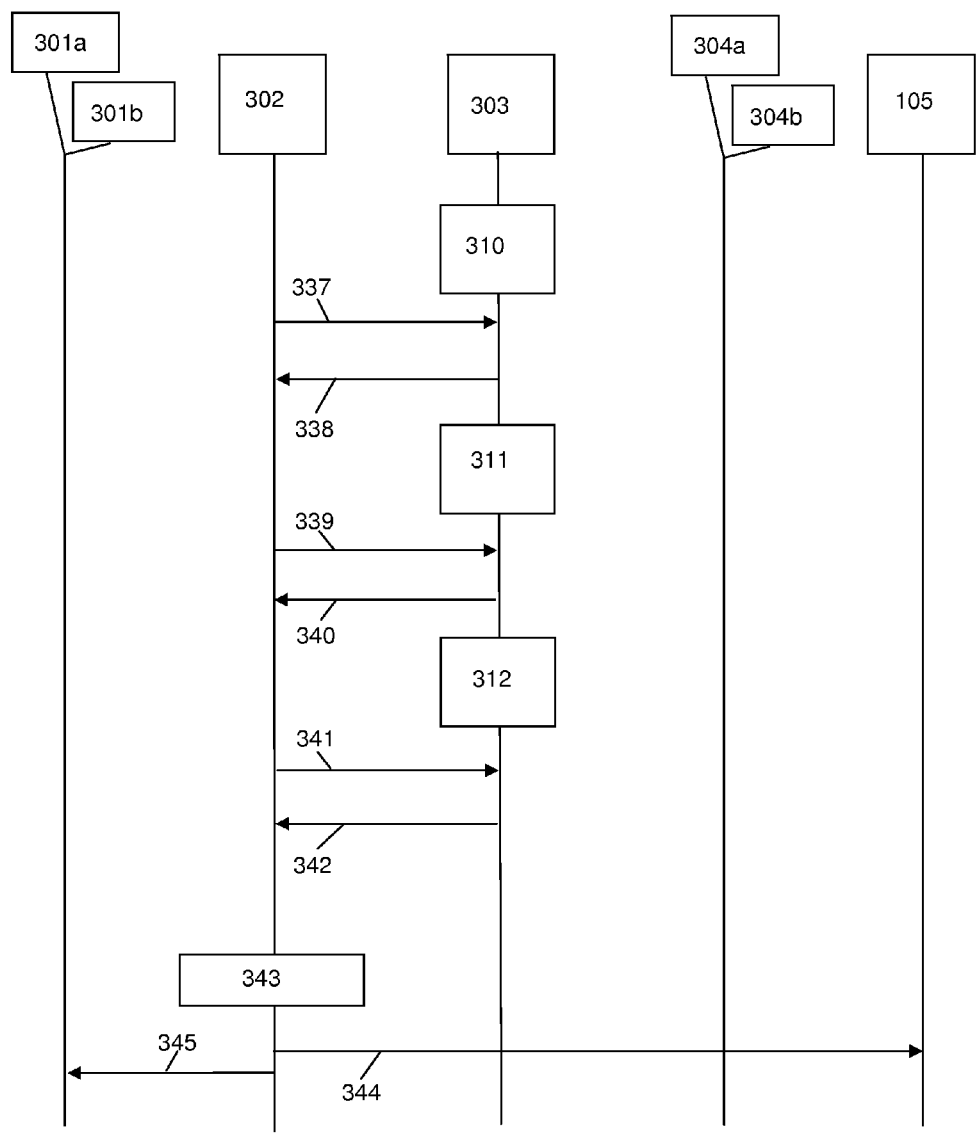

With reference to FIG. 3a and FIG. 3b, the activation and monitoring of a service will now be described, by way of example only and in accordance with many of the embodiments of the present invention. In this example, the service to be activated is Mobile TV, which the network operator wishes to offer to their subscribers. Furthermore, in this example, the feature management aspect (e.g. functionality and capability) is provided by a separate Feature Management System (FMS).

In step 313 the network operator 301a will transmit a request to the FMS 302 to activate the service of Mobile TV in all of or in a specified part of the network operator's telecommunication network. Alternatively, the ServMS 301b may instruct the FMS 302 to provision and activate the service of Mobile TV in all of or in the specified part of the network operator's telecommunication network.

In this example, the FMS 302 in step 314 interacts with the NMS 303 to request topology information relating to the NEs in the area of the telecommunication network that will be affected by the activation of the requested service.

However, as will be appreciated, the FMS 302 may alternatively or in combination request topology information from the ServMS 301b or the network operator 301a. The topology information may also be specified by the ServMS 301b or the network operator 301a as part of the request to provision and activate the service as the request may explicitly name and identify the NEs that will affected. In another example, the network operator 301a or ServMS 301b may provide a list of lower level elements in the network, e.g. Base Station Transceivers (BTS) and technology information, e.g. 3G information, and the FMS 302 may then request other topology data from the NMS 303 relating to other NEs, e.g. Radio Network Controllers (RNCs) and Serving General Packet Radio Service (GPRS) Support Nodes (SGSNs) that will be affected by the activation of the requested service.

The network topology information may not be required when activating certain services, for example, a service that affects only the management systems, and thus this step is optional and dependent on the service being activated.

In this example of activating the service of Mobile TV, the FMS 302 will require topology information from the NMS 303 which, in step 315, responds to the FMS 302 with the requested topology information.

In step 316 the FMS 302 will obtain and/or identify the prerequisite features that are required to activate the requested service. The FMS 302 may determine the prerequisite features by interacting with a database that is part or the FMS 302 or separate to the FMS 302 but operationally connected thereto.

In the present example of activating the service of Mobile TV the prerequisite features that may be identified from the prerequisite feature database may include:

Modulation in the NodeBs
Turn off turbo coding at NodeBs and RNCs or Internet High Speed Packet Access (I-HSPA) Adapter
Relevant licenses The prerequisite features identified for the requested service may in turn require further prerequisite features in order to be fulfilled. In other words, in order to check that one "higher level" prerequisite feature can be fulfilled it may be necessary to check that further "lower level" prerequisite features are also fulfilled first.

Thus, for a particular service all of the prerequisite features may be listed in the database (e.g. all higher level and lower level prerequisite features) in a logical or chronological order that the prerequisite features have to be checked that they are fulfilled.

Alternatively, for a particular service only the higher level prerequisite features may be listed in the entry in the database corresponding to the particular service. If a so-called higher level prerequisite feature is identified then the FMS may interact with the database in order to identify the so-called lower level prerequisite features that have to be fulfilled in order to be able to fulfil the higher level prerequisite feature.

For example, in the present example of activating the service of Mobile TV one of the prerequisite features is to Turn Off Turbo Coding. However, in order to Turn Off Turbo Coding (and thereby fulfil this higher level prerequisite feature) further lower level prerequisite features relating to the parameter configuration of the affected NEs and to the software requirements of the affected NEs need to be fulfilled first.

Similarly, the prerequisite feature of 64QAM Modulation in the NodeBs may require further lower level feature prerequisites such as ones relating to the required software on the NodeBs, particular configuration of the NodeBs and particular hardware present in the NodeBs.

Thus, the database entry relating to the service of Mobile TV may list all prerequisite features (e.g. both higher level prerequisite features and lower level prerequisite features) necessary to activate the service.

Alternatively, the database entry relating to the service of Mobile TV may list the higher level prerequisite features. The database may then include further entries relating to the higher level prerequisite features in which the lower level prerequisite features are listed so that if the FMS identifies a higher level prerequisite feature then the FMS will interact with the database to identify the necessary lower level prerequisite features.

Once the FMS 302 has identified the prerequisite features that are required in order to activate the service then the FMS 302 may proceed to determine whether the prerequisite features can be fulfilled.

Accordingly, the FMS 302 in step 317 may transmit the hardware prerequisite features (identified from the prerequisite feature database) for the NEs to an HwM application 306, which is typically part of the NMS 303. The HwM application 306 typically maintains a repository of the hardware in the telecommunication network and therefore can check whether the NEs have the required hardware in order to fulfil a particular prerequisite feature for the service. If the HwM application 306 does not have particular information on the hardware of a particular NE then the HwM application 306 may further in step 318 request the NEs 304b or the EMS 304a to inform and upload the hardware configuration of the NEs. If the HwM application 306 requests hardware configuration information then in step 319 the NEs 304b and/or the EMS 304a will respond by uploading the required hardware information to the HwM application 306.

The HwM application 306 will respond in step 320 to the FMS 302 with information regarding the available hardware in the NEs. The information provided to the FMS 302 will be sufficient for the FMS to determine whether the hardware prerequisite features can be fulfilled. If the hardware prerequisite features are not fulfilled by one or more NEs then the information provided to the FMS 302 from the HwM application 306 will be sufficient for the FMS 302, network operator 301a, ServMS 301b or the network provider to determine whether other options may be chosen in order to be able to activate the service given the hardware in the NEs or whether the NEs hardware need to be upgraded.

In step 321 the FMS 302 may transmit the software prerequisite features (identified from the prerequisite feature database) for the NEs to the SwM application 307, which is typically part of the NMS 303. The SwM application 307 typically maintains a repository of the software installed in the NEs and therefore can check whether the NEs have the required software in order to activate the requested service. If the SwM application 307 does not have particular information on the software installed on a particular NE then the SwM application 307 may further in step 322 request the NEs 304b and/or the EMS 304a to inform and upload 323 to the SwM application 307 the software configuration of the NEs.

If the SwM application 307 determines that the necessary software (or software release or version) is not currently installed and activated on one or more of the NEs then, in step 324, the SwM application 307 will initiate the download and activation of the required software to those NEs.

Alternatively, the FMS 302 may be informed of the current software configuration on the NEs and instruct the SwM application 307 to perform the necessary software updates should this be necessary.

If a software update was required then, in step 325, the SwM application 307 may receive information stating whether or not the software update had been successful.

The SwM application 307 may then, in step 326, transmit a status report to the FMS 302 detailing the status of the software configuration in the NEs and, if necessary, any problems encountered.

In step 327, the FMS 302 interacts with a CM application 308, which is typically part of the NMS 303, in order to set the required configuration for the requested service on the NEs.

The FMS 302 may provide the CM application 308 with a configuration plan that the FMS 302 has determined or identified from the prerequisite feature database. The FMS 302 may determine the configuration plan using network planning tools (e.g. radio network planning tools) that may be integrated with the FMS 302. Alternatively, the FMS 302 may interact with network planning tools (e.g. radio network planning tools) located elsewhere, for example, in the NMS 303 in order to determine the configuration plan. In step 328, the CM application 308 will configure the NEs in accordance with and following the configuration plan provided by the FMS 302.

Alternatively, the FMS 302 may provide the CM application 308 with a list of configuration requirements and let the CM application 308 determine and/or identify the necessary configuration parameters. In this case the CM application will then, in step 328, configure the NEs accordingly.

In both cases, the CM application 308 may receive 329 information from the NEs 304b and/or the EMS 304a informing the CM application 308 as to whether the configuration parameters and settings have been successfully set.

In step 330, the CM application 308 may transmit a status report relating to the configuration of the NEs to the FMS 302.

In step 331, the FMS 302 may request a LM application 309, which is typically part of the NMS 303, to provision or provide information regarding the licenses required to enable the service to be activated on the NEs. As part of the request the FMS 302 may provide a list of the required licenses which may have been identified from the prerequisite feature database to the LM application 309.

The LM application 309 may check a repository of the licenses provisioned in the NEs and therefore can check whether the NEs have the required licenses in order to activate the service. Alternatively, the LM application 309 will interact with the NEs 304b and/or the EMS 304a to check the existence of the licenses in the NEs.

In both of the above cases, if one or more NEs do not have the one or more of the necessary licenses then the LM application 309 will initiate the provisioning of the appropriate licenses to those NEs in step 332. For example, in one licensing concept or model the necessary licenses may be provisioned by downloading and installing the licenses in each of the affected NEs. In another licensing concept or model the necessary licenses may be provisioned by informing the affected NEs that the necessary licenses have been obtained and therefore the NEs can activate the feature. As a person skilled in the art will appreciate, there are several possible licensing concepts or models which may be used to provision the appropriate or necessary licenses in order to be able to activate the requested service.

The LM application 309 may then receive 333 information from the NEs 304a and/or EMS 304b relating to the provisioning of the licenses thereby enabling the FMS 302 to determine if the prerequisite feature relating to licenses has been successfully fulfilled. In step 334, the LM application 309 may transmit a status report to the FMS 302.

If the status reports received at the FMS 302 from the HwM application 306, the SwM application 307, the CM application 308 and the LM application 309 inform the FMS 302 that the prerequisite features required to activate the requested service have been fulfilled then, in step 335, the FMS 302 may inform the CBC 305 of the service that is to be activated in the network operator's telecommunication network. This enables the network operator to be charged the appropriate amount for activating the service.

Accordingly, at this point the service will be activated which in this example means that the Mobile TV service can now be offered to the network operator's subscribers. In step 336, the FMS 302 will transmit a status report to the network operator 301a and/or the ServMS 301b detailing the activation of the service.

If any problems occurred that prevent the service from being activated then the FMS 302 would be informed via the above mentioned status reports. The FMS 302 may stop the provisioning process as soon as a negative status report is received and report this to the network operator 301a and/or the ServMS 301b. Alternatively, the FMS 302 may continue with the provisioning process until all status reports have been received and provide a status report showing which prerequisite features were fulfilled and which, if any, prerequisite features were not fulfilled.

In this case, the status report transmitted in step 336 will detail any exceptions, alarm events or fault events that may have been raised during the activation process of the service. The status report may also include information regarding any possible corrective actions that could be taken in order to resolve the identified problems.

As described hereinabove, the FMS 302 may further monitor the performance of the service and the telecommunication network for a period after the service has been activated. The monitoring process in accordance with many of the embodiments will be described by way of example only and with reference to FIG. 3b The FMS 302, in step 337, may interact with a Log Management (LogM) application 310, which is typically part of the NMS 303, in order to check the logs that are collected and collated by the LogM application 310. The FMS 302 requests the log entries relating to the service that has been activated in the telecommunication network from the LogM application 310. The LogM application 310, in step 338, responds to the FMS 302 with the relevant log entries which indicate to the FMS 302 whether there have been any interruptions caused directly or indirectly by the activated service.

The FMS 302, in step 339, may also interact with a PM application 311, which is typically part of the NMS 303, in order to request performance indicators relating to the operation of the service in the NEs. The PM application 311 responds to the FMS 302 in step 340 with the relevant performance indicators.

The FMS 302, in step 341, may also interact with a FM application 312, which is typically part of the NMS 303, in order to request any alarm events or fault events raised by the NEs in relation to the service. In other words, the FMS 302 requests any service related alarms from the FM application 312. In step 342, the FM application 312 responds to the FMS 302 with the relevant alarm events or fault events.

Once the FMS 302 has received the monitoring information relating to the service, e.g. log information, performance information, fault information, then the FMS 302 can determine 343 based on the monitoring information whether any changes should be made to the setup and configuration of the service in the NEs.

If the FMS 302 determines that the configuration of the service requires alteration based on the monitoring information then the FMS 302 may initiate the change in configuration of the NEs. If the FMS 302 can identify the necessary configuration changes then the FMS 302 may request the CM application 308 to make the necessary configuration changes. Alternatively, the FMS 302 may request that the CM application 308 identify and implement the necessary configuration changes. In another alternative, the FMS 302 may initiate the activation process of the service from the beginning. In other words, the FMS may restart the process of activating the service in the NEs depending on the received monitoring information.

In step 344, the FMS 302 may transmit the monitoring information, or a status report based on the monitoring information, to the CBC 305 so that the charging and billing information can be updated accordingly.

In step 345, the FMS 302 may also transmit a status report based on the monitoring information to the network operator 301a and/or the ServMS 301b.

Accordingly, in many of the embodiments of the present invention the FMS may on receipt of a request for a service to be activated in any part of or in the network operator's entire telecommunication network, take any or all of the steps described above to activate and monitor the service in the network operator's telecommunication network.

In the above described embodiments, the Feature Management aspect is provided by an FMS which is a separate system that performs the steps necessary to activate and monitor the service whilst interacting with various tools and applications based, for example, in the NMS.

However, as mentioned hereinabove, the Feature Management aspect may be provided by a Feature Management Application (FMA) integrated with a management system (e.g. EMS, NMS or ServMS). In this case, the FMA may then follow any or all of the steps and processes described hereinabove.

In the above described example, the service activated was Mobile TV which is offered as a service to the network operator's subscribers. However, in many of the embodiments, the service requested may be a management service based in one or more of the management systems, e.g. NMS, EMS or ServMS, or the service requested may relate to improving the operation or use of the telecommunication network for the network operator. Moreover, for certain services the NEs may not be affected, for example, if the service is a management service then the NEs may not require configuration or the need to obtain topology information and so on.

Figure 4:
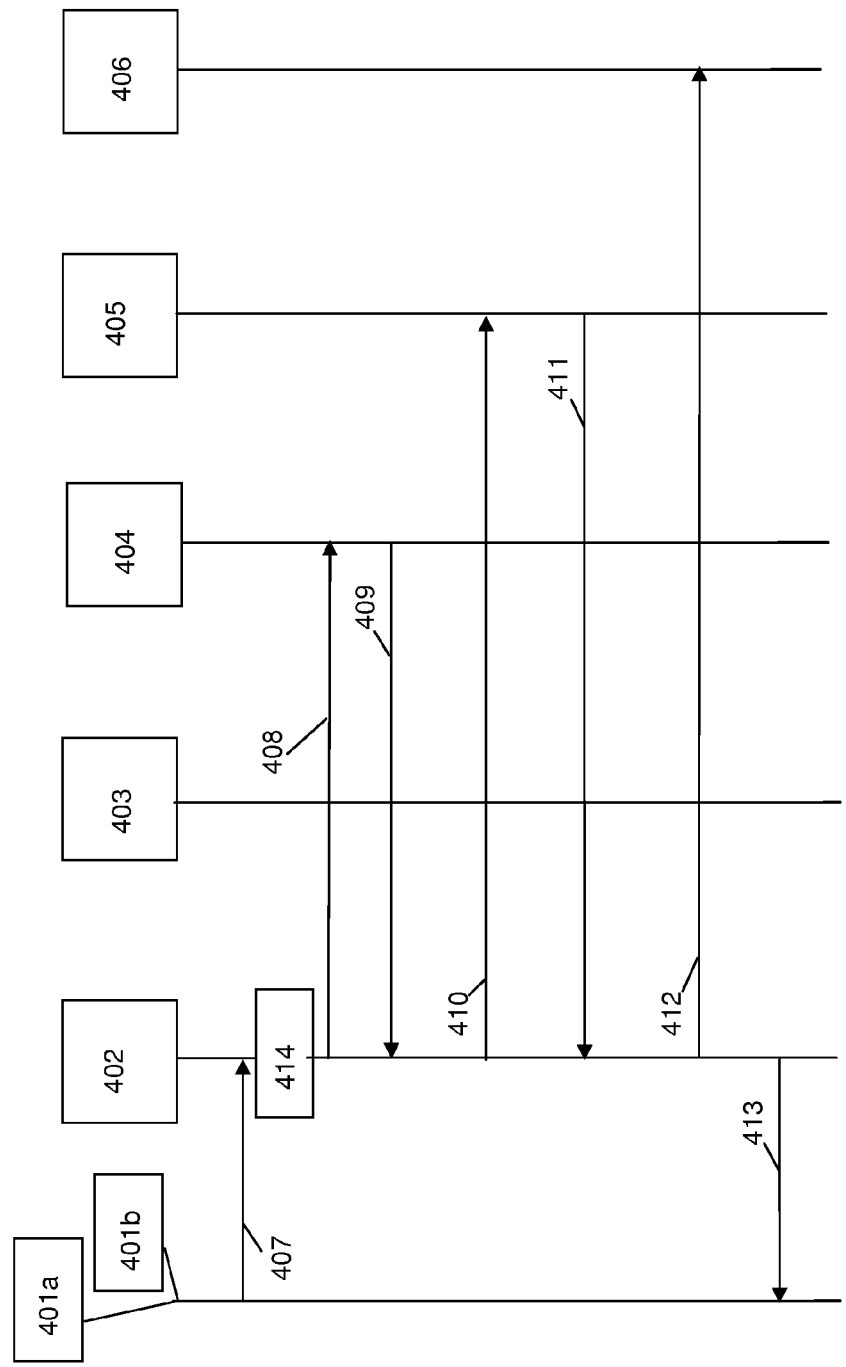
FIG. 4 is a message flow diagram in accordance with many of the embodiments of the present invention.

With reference to FIG. 4, the activation of a service based in the NMS will now be described, by way of example only, and in accordance with many of the embodiments of the present invention.

In this example, the Feature Management aspect will be provided by a Feature Management Application (FMA) 402 integrated with the NMS platform 404 which will perform the process of activating the service, which in this example is a new application 403, in the NMS. As described hereinabove, the Feature Management aspect may alternatively be a separate system independent of the NMS or part of another system such as the EMS or the ServMS.

In this example the service is an NMS application 403 to improve the Hardware Management functionality and capability by providing a Hardware Browser for 3G elements.

In step 407, the network operator 401a requests the activation of the NMS application 403. Alternatively, the ServMS 401b may request the activation of the NMS application 403.

The FMA 402 may check 414 a prerequisite feature database to determine or identify the prerequisite features required to activate the service e.g. the NMS application 403. In this example, one of the prerequisite features is whether the NMS application 403 is present on the NMS platform 404 or available to the NMS platform 404.

Accordingly, in step 408, the FMA 402 interacts with the NMS platform 404 in order to determine or identify whether the NMS application 403 is present on the NMS platform 404.

In step 409, the NMS platform 404 responds with status information regarding the requested NMS application 403. The status information may include detailed information regarding the NMS application 403 or may just state whether or not the NMS application 403 is present on the NMS platform 404.

If it is determined that the NMS application 403 is not present then steps may be taken in order to install the NMS application 403 on the NMS platform 404 so that it is present on the NMS platform 404. Thus, when the NMS application 403 is present on the NMS platform 404 then this prerequisite feature will be fulfilled.

A further prerequisite feature in this example is that the necessary licenses are provisioned to enable the network operator to use the service, e.g. the NMS application 403 for the hardware browser for 3G elements. Thus, the FMA 402, in step 410, interacts with an LM application 405 to ensure the appropriate licenses identified from the prerequisite features database are provisioned.

In step 411, the LM application 405 responds to the FMA 402 with status information regarding the provisioning of the licenses. The status information may include detailed information regarding the status of the licenses or may simply be a positive or negative result enabling the FMA 402 to determine if the prerequisite feature is fulfilled.

If the required prerequisite features have been fulfilled then the service, which in this example is the NMS application 403 for the hardware browser for 3G elements, can be activated and available for use.

In step 412, the FMA 402 may interact with the CBC 406 so that the network operator can be charged accordingly for the newly activated service.

The FMA, in step 413, may then send a status report of the activation process of the service to the party that requested the activation of the service. In other words, the status report may be sent to the network operator 401a or to the ServMS 401b depending on where the request originated.

The status information may contain information regarding the successful or unsuccessful activation of the requested service. If the activation of the service was unsuccessful then the status report may include information as to why the activation was unsuccessful and may further include information as to steps that could be taken to rectify the problem.

As with the previous example, the FMA 402 may interact with Performance Management, Log Management and Fault Management in order to determine and/or identify whether the activated service is operating correctly and without any problems.

The above described examples show the process for activating a service in the managed network and for activating a service in the management systems. Furthermore, the above described examples show the implementation of the Feature Management aspect as a separate system and as an application integrated with one of the management systems. As will be appreciated, the actual prerequisite features and steps to activate a particular service will vary depending on the service in question and the requirements of the service. The Feature Management aspect in accordance with many of the embodiments determines or identifies the prerequisite features for a given service and determines or identifies whether those prerequisite features can be fulfilled taking any actions necessary to activate the requested service.

In many of the embodiments the network operator may also wish to deactivate a particular service in their telecommunication network. Accordingly therefore, in many embodiments of the present invention the FMS or FMA (depending on implementation) may be used to deactivate a particular service.

Figure 5:
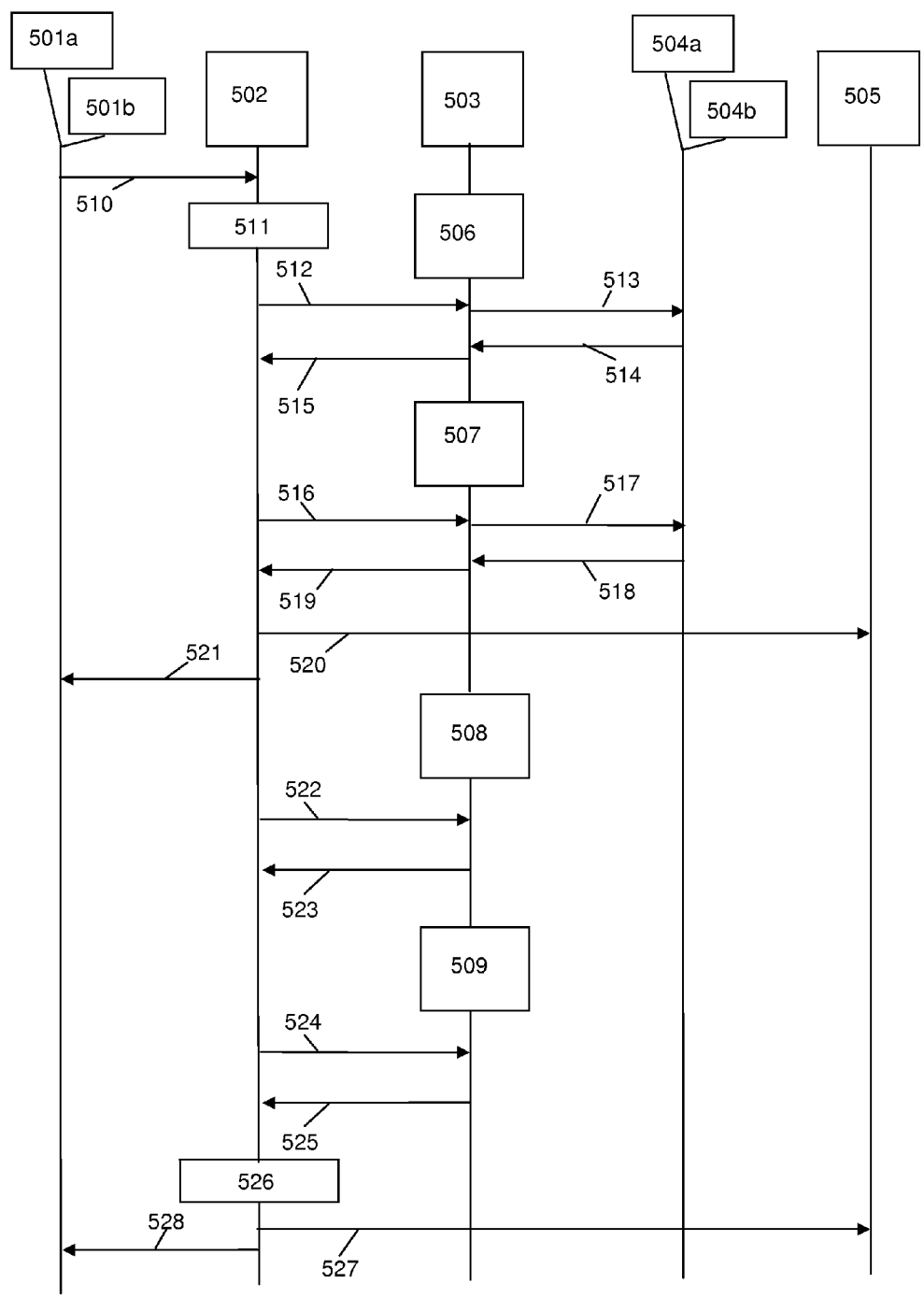
FIG. 5 is a message flow diagram in accordance with many of the embodiments of the present invention.

With reference to FIG. 5, the deactivation of a service will now be described, by way of example only, and in accordance with many of the embodiments of the present invention.

In this example, the FMS 502 will perform or initiate the steps and processes required to deactivate a service where the FMS 502 is a separate system located hierarchically above the NMS 503 but below the ServMS 501b, if the ServMS 501b is implemented in the telecommunication network architecture.

The FMS 502, in step 510, will receive a request to deactivate a specified service. The request may be received directly from the network operator 501a or via the ServMS 501b.

The FMS 502 may interact with a prerequisite feature database in order to determine and identify 511 the required prerequisite features that need to be fulfilled in order to deactivate the identified service. The prerequisite feature database may be part of the FMS 502, part of the NMS 503 or a separate database operatively connected to the FMS 502.

In step 512, the FMS 502 may interact with a CM application 506, where the CM application 506 is typically part of the NMS 503, in order to instruct or request the CM application 506 to set the relevant configuration settings and parameters which are to be used by the NEs after the service has been deactivated.

The FMS 502 may provide the CM application 506 with a detailed configuration plan that the CM application 506 will follow or the FMS 502 may provide the CM application 506 with a list of configuration parameters and values. The configuration plan and/or the configuration parameters and values may be identified by the prerequisite features.

If the FMS 502 provides the CM application 506 with a configuration plan then the FMS 502 will include some network planning functionality or may interact with network planning tools. If the FMS 502 provides a list of configuration parameters and values then the FMS will give the CM application 506 the responsibility to perform the necessary planning and set the necessary configuration parameters.

In both cases, the configuration changes in the NEs 504a and/or EMS 504b are performed by the CM application 506 in step 513. The CM application 506 may receive in step 514 confirmation from the EMS 504a and/or the NEs 504b that any necessary configuration changes had been successfully, or not, performed.

The CM application 506 will respond to the FMS 502 in step 515 with a status report relating to the configuration changes. The status report may include detailed information or more simply a positive or negative result as to whether or not the configuration changes were successful. Therefore, the FMS 502 may determine whether or not the corresponding prerequisite feature has been fulfilled.

A further prerequisite feature identified from the prerequisite feature database may relate to the need to revoke particular licenses as the service is being deactivated. Therefore, in step 516, the FMS 502 may interact with a LM application 507, which is typically part of the NMS 503, requesting that the LM application 507 revokes the identified licenses. The identified licenses may be revoked by removing the license from the affected element (e.g. the NEs or management systems) or by informing the affected elements that the licenses are no longer valid or exist in relation to the network operator. In step 517, the LM application 507 will perform the necessary steps to revoke the identified licenses in the affected elements.

The LM application 507 may receive confirmation 518 from the NEs 504b and/or the EMS 504a as to whether the revocation of the identified licenses has been successful or not. The LM application 507 may also respond 519 to the FMS 502 with a status report stating whether or not the revocation of the identified licenses was successful. Therefore, the FMS 502 may determine whether or not the corresponding prerequisite feature has been fulfilled.

If the licenses for the particular service are successfully revoked and any necessary configuration of the NEs was also successful then the service will effectively be deactivated as the service can no longer be used in the network operator's telecommunication network. Thus, in step 520, the FMS 502 interacts with a CBC 505 to inform the CBC 505 that the service has been deactivated so the network operator can be charged accordingly.

The FMS 502, in step 521, may also transmit a status report to the party from which the FMS 502 initially received the request to deactivate the service. For example, if the network operator 501a requested the deactivation of the service then the status report is transmitted to the network operator 501a and if the ServMS 501b requested the deactivation of the service then the status report is transmitted to the ServMS 501b. Alternatively, the FMS 502 may send the status report to both the network operator 501a and the ServMS 501b.

The status report may include information regarding the deactivation of the service, e.g. whether or not the deactivation was successful and, if not, it may include information regarding the reason for the failure along with any known corrective actions that may need to be taken.

As with the above described steps for provisioning and activating a service, in many of the embodiments the FMS 502 may also monitor the performance and operation of the telecommunication network for a period of time after the service is deactivated. The period during which the telecommunication network is monitored by the FMS 502 can be any period deemed appropriate, for example, the period may be one day, one week, several weeks, a month, several months, a year, several years and so on.

The FMS may monitor the performance and operation of the telecommunication network in order to identify and determine any problems or malfunctions relating to the deactivation of the service, e.g. due to the revocation of licenses, the reconfiguration of the NEs and so on.

Returning to FIG. 5, the FMS 502, in step 522, may interact with a PM application 508, which is typically located in the NMS 503, in order to request information regarding the performance of the NEs in the telecommunication network. In step 523, the PM application 508 responds to the FMS 502 with the relevant performance parameters and indicators.

The FMS 502, in step 524, may further interact with a FM application 509, which is typically part of the NMS 503, in order to request information regarding any fault events or alarm events generated by NEs which are related to the deactivation of the service. In step in step 525, the FM application 509 responds to the FMS 502 with information relating to any relevant fault events and alarm events.

Additionally, the FMS 502 may also interact with a LogM application, which is typically part of the NMS 503, in order to check the logs collated by the LogM application which will identify any recorded interruptions relating to the deactivation of the service.

The FMS 502 will analyse 526 the monitoring information received in relation to the operation and performance of the NEs to determine and identify whether the configuration of the NEs needs to be altered in order to improve the operation and performance of the telecommunication since the service was deactivated. If it is determined or identified that the configuration of the NEs should be changed then the FMS 502 will interact with the CM application 506 to ensure the necessary changes are made.

The FMS 502, in step 527, may interact with a CBC 505 in order to inform the CBC 505 of the performance information and corrective actions taken, if any, so that the network operator can be charged accordingly.

The FMS 502 may also transmit a status report, in step 528, to the network operator 501a and/or the ServMS 501b. The status report may contain basic or detailed information depending on the requirements regarding the performance and operation of the NEs after the service has been deactivated. The status report may also include information about corrective measures taken, if any, or information on how to resolve problems in the NEs relating to the deactivation of the service if any such problems have occurred.

In the above described examples, it has been shown how to activate and deactivate various services using the Feature Management aspect of the present invention. The prerequisite features for activating or deactivating each service will vary, for example, a service that is to be activated or deactivated in the managed network may require topology information of the managed network and for the NEs to be configured whilst a service to be activated or deactivated in the management systems will typically require only changes to the management systems.

Accordingly, in the embodiments it is necessary for the Feature Management aspect (e.g. FMS or FMA) to identify or determine the prerequisite features for activating or deactivating a service and then determining and/or identifying whether the prerequisite features are fulfilled or taking the necessary steps to fulfil the prerequisite features so that the service can be activated or deactivated.

Accordingly, many embodiments of the present invention enable network management to be implemented at a feature level for the services that are to be activated or deactivated in a telecommunication network. The Feature Management aspect of many of the embodiments of the present invention enables a service to be activated and/or deactivated in part of or in a network operator's entire telecommunication network.

In many of the embodiments the Feature Management aspect may further monitor the part of the telecommunication network, e.g. the NEs or management systems, which were affected by the activation or deactivation of a particular service for a period after the activation or deactivation of that service. By monitoring the telecommunication network the Feature Management aspect of many of the embodiments may determine or identify based on the monitored information whether the affected parts of the telecommunication network are operating correctly and with an acceptable level of performance.

If the Feature Management aspect determines or identifies any malfunctions or problems then the Feature Management aspect may take the appropriate corrective actions or report the malfunctions/problems to a user or system.

As described hereinabove, the Feature Management aspect of the embodiments was provided as a separate system to the other management systems, e.g. the FMS, or as an application, e.g. the FMA, integrated with a management system, e.g. the NMS.

However, as a skilled person will appreciate, the Feature Management aspect could equally be provided as part of the EMS (Element Management System) or the ServMS (Service Management System). In the case that the Feature Management aspect is integrated with the EMS, the Feature Management aspect will also need to know or be able to obtain network architecture and arrangement information in order to determine which elements in the telecommunication network will be affected by the activation or deactivation of a particular service.

In many of the embodiments the Feature Management aspect will interact with, or interrogate, a prerequisite feature database in order to determine and identify the prerequisite features relating to the activation or deactivation of a particular service. The prerequisite feature database may be integrated with the Feature Management aspect or the prerequisite feature database may be integrated with one of the management platforms or the prerequisite feature database may be a separate database located on a computing device operationally connected to the Feature Management aspect.

The prerequisite feature database may comprise, for all services that may be activated or deactivated in the network operator's telecommunication network a list of prerequisite features relating to, for example, details of the required hardware, details of the required software, details of the required licenses, details relating to the configuration of the relevant types of NEs along with any other details relating to the activation of a service or the deactivation of a service.

The services which can be activated or deactivated can include any service that may be offered to the network operator's subscribers, any service relating to the management of the telecommunication, any service relating to the use of the telecommunication network, any service relating to the operation of the telecommunication network and so on. The term service also encompasses tools, applications, functionalities or capabilities.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising the steps of:
receiving a request to activate or deactivate a service in a telecommunication network;
identifying at least one prerequisite feature necessary to activate or deactivate said service;
determining if each of said at least one prerequisite feature is fulfilled such that said service in said telecommunication network is activated or deactivated in the event that all of said at least one prerequisite features for said service are fulfilled;
transmitting a status report indicating the success or failure of activating or deactivating said service in response to the received request;
receiving monitoring information wherein said monitoring information relates to the performance and operation of said telecommunication network for a period after said service has been activated or deactivated;
analyzing said monitoring information to determine if any problems are identified in the telecommunication network relating to the activation or deactivation of said service;
if said problems are identified then said method further comprises:
identifying at least one corrective action to take in response to said identified problems and
performing said identified corrective actions,
wherein the receiving, identifying, determining, and transmitting occur at a computing device disposed in a management layer of said telecommunication network.

2. The method as claimed in claim 1 in which said step of identifying at least one prerequisite feature further comprises:
requesting said at least one prerequisite feature necessary to activate or deactivate said service from a database; and
receiving said at least one prerequisite feature necessary to activate or deactivate said service from said database.

3. The method as claimed in claim 1 further comprising:
transmitting each of said at least one prerequisite features to at least one telecommunication network application or system to determine if each of said at least one prerequisite features are fulfilled.

4. An apparatus comprising:
a first input adapted to receive a request to activate or deactivate a service in a telecommunication network;
a first processor adapted to identify at least one prerequisite feature necessary to activate or deactivate said service;
a second processor adapted to determine if each of said at least one prerequisite feature is fulfilled such that said service in said telecommunication network is activated or deactivated in the event that all of said at least one prerequisite features for said service are fulfilled;
a third input adapted to receive monitoring information wherein said monitoring information relates to the performance and operation of said telecommunication network for a period after said service has been activated or deactivated;
a third processor adapted to analyze said monitoring information to determine if any problems are identified in the telecommunication network relating to the activation or deactivation of said service;
a fourth processor adapted to identify at least one corrective action to take in response to said identified problems; and
a fifth processor adapted to perform said identified corrective actions,
wherein the second processor is adapted to generate a status report indicating the success or failure of activating or deactivating said service in response to the received request, and
wherein the second processor is disposed in a management layer of said telecommunication network.

5. The apparatus as claimed in claim 4 further comprising:
a first output adapted to request said at least one prerequisite feature necessary to activate or deactivate said service from a database; and
a second input adapted to receive said at least one prerequisite feature necessary to activate or deactivate said service from said database.

6. The apparatus as claimed in claim 4 further comprising:
a second output adapted to transmit each of said at least one prerequisite features to at least one telecommunication network application or system to determine if each of said at least one prerequisite features are fulfilled.

7. A non-transitory computer program product comprising computer readable executable code for:
receiving a request to activate or deactivate a service in a telecommunication network;
identifying at least one prerequisite feature necessary to activate or deactivate said service;
determining if each of said at least one prerequisite feature is fulfilled such that said service in said telecommunication network is activated or deactivated in the event that all of said at least one prerequisite features for said service are fulfilled;
transmitting a status report indicating the success or failure of activating or deactivating said service in response to the received request;
receiving monitoring information wherein said monitoring information relates to the performance and operation of said telecommunication network for a period after said service has been activated or deactivated;
analyzing said monitoring information to determine if any problems are identified in the telecommunication network relating to the activation or deactivation of said service;
identifying at least one corrective action to take in response to said identified problems; and
performing said identified corrective actions,
wherein the receiving, identifying, determining, and transmitting occur at a computing device disposed in a management layer of said telecommunication network.

8. The computer program product as claimed in claim 7 in which said computer readable executable code for identifying at least one prerequisite feature further comprises computer readable executable code for:
requesting said at least one prerequisite feature necessary to activate or deactivate said service from a database; and
receiving said at least one prerequisite feature necessary to activate or deactivate said service from said database.

9. The computer program product as claimed in claim 7 further comprising computer readable executable code for:
transmitting each of said at least one prerequisite features to at least one telecommunication network application or system to determine if each of said at least one prerequisite features are fulfilled.

\* \* \* \* \*